United States Patent [19]

Kirk et al.

[11] Patent Number: 4,965,723
[45] Date of Patent: Oct. 23, 1990

[54] BUS DATA PATH CONTROL SCHEME

[75] Inventors: John Kirk, Boxboro; Larry Narhi, Bolton, both of Mass.

[73] Assignee: Digital Equipment Corporation, Maynard, Mass.

[21] Appl. No.: 111,642

[22] Filed: Oct. 23, 1987

[51] Int. Cl.$^5$ .................................. G06F 13/36
[52] U.S. Cl. .................................. 364/200; 364/240; 364/240.1; 364/240.5
[58] Field of Search ... 364/200 MS File, 900 MS File

[56] References Cited

U.S. PATENT DOCUMENTS

| | | | |
|---|---|---|---|
| 4,144,562 | 3/1979 | Cooper | 364/200 |
| 4,286,321 | 8/1981 | Baker et al. | 364/200 |
| 4,296,464 | 10/1981 | Woods et al. | 364/200 |
| 4,296,469 | 10/1981 | Gunter et al. | 364/200 |
| 4,321,665 | 3/1982 | Shen et al. | 364/200 |
| 4,388,697 | 6/1983 | Breen et al. | 364/900 |
| 4,495,574 | 1/1985 | Hofsetter | 364/200 |
| 4,523,276 | 6/1985 | Maejima et al. | 364/200 |
| 4,631,671 | 12/1986 | Kawashita et al. | 364/200 |
| 4,635,192 | 1/1987 | Ceccon et al. | 364/200 |
| 4,683,534 | 7/1987 | Tietjen et al. | 364/200 |

*Primary Examiner*—Raulfe B. Zache
*Attorney, Agent, or Firm*—Kenyon & Kenyon

[57] ABSTRACT

A bus data path control scheme facilitates communications in a data processing system between subsystem elements that have different data widths. A plurality of buses is provided whereby each subsystem or element is connected to one of the plurality of buses. A control logic array detects requests to transfer data between subsystems. Each of the plurality of buses are connected to one another through a bidirectional transceiver. Once the control logic array detects the request for transferring data between subsystems, the array and the transceiver operate in concert to permit subsystem devices having different data widths to communicate with one another. In particular, the array and transceiver act to redirect data so that as it is shifted from a first bus to which the sending subsystem is connected to a second bus to which the receiving subsystem is connected, the data is moved into the proper bit location on the second bus so as to be received properly by the receiving subsystem.

10 Claims, 1 Drawing Sheet

BUS DATA PATH CONTROL SCHEME

BACKGROUND OF THE INVENTION

1. Field of the Invention

The present invention relates to a bus data path control scheme. In particular, the present invention relates to a scheme in a data processing system by which subsystems of the data processing system, having different data widths, are capable of communicating with each other in a fast manner where a minimum amount of hardware is required for interfacing the subsystems.

2. Description of the Related Art

Known data processing systems may consist of a central processing unit and a plurality of subsystems. In particular, data processing systems may include a plurality of memory subsystems such as dynamic random access memories (dRAMs), video dynamic random access memories (video dRAMs) and other read only memories (ROMs). The data processing system may also include such subsystems as a disk controller, a cursor controller, a serial line controller and/or a plurality of other subsystem elements.

It is possible that not all of the subsystem elements of the data processing system will have the same data widths. For example, a disk controller in the system may be a 32 bit disk controller, that is it may have a data width of 32 bits. In contrast, a serial line controller in the system may be a 16 bit device. Similarly, memory devices in the system may be 16 or 32 bit devices.

It is sometimes necessary to transfer data from a device or subsystem having a first data width to a device or subsystem having a second data width where the two data widths are different.

Prior data processing systems have accommodated such transfers by using registers and multiplexers on the inputs and outputs of each of the subsystems. The multiplexers and registers permit a conversion of the data width of a device so as to make communications between devices having different data widths more uniform. Unfortunately, registers and multiplexers for the inputs and outputs of each of the subsystems constitute a considerable amount of hardware. In addition, signal processing through these multiplexers and registers introduces an undesirable amount of delay into the operation of the system.

SUMMARY OF THE INVENTION

The present invention obviates the disadvantages associated with known systems for establishing communications between subsystems having different data widths. In the present invention, a bus data path controller for a data processing system is disclosed which controls a plurality of subsystems in which it is desirable to transfer data between subsystem elements having different data widths.

The bus data path controller controls a system that includes a plurality of buses, where each bus has a data path width equal to or greater than a data path width of a subsystem having the greatest data path width. The subsystems that have different data path widths may be coupled to each of the buses. The bus data path controller controls the flow of data between subsystems over the buses.

The controller includes a logic array for producing a control signal in response to a request to transfer data from a sending subsystem, which is coupled to one of the plurality of buses, to a receiving subsystem. The controller also includes several transceivers for controlling the data width of a flow of data between any two of the buses. These transceivers are responsive to the control signal from the logic array so that data from the sending subsystem is transferred to the receiving system.

These transceivers may convert the data width of the data from the sending subsystem to the data width associated with the receiving subsystem. In addition, the logic array may include a control logic circuit which is disposed on a single chip.

BRIEF DESCRIPTION OF THE DRAWINGS

The present invention will be understood from the detailed description set forth below in connection with the drawing of the present application in which.

DETAILED DESCRIPTION

Figure 1:
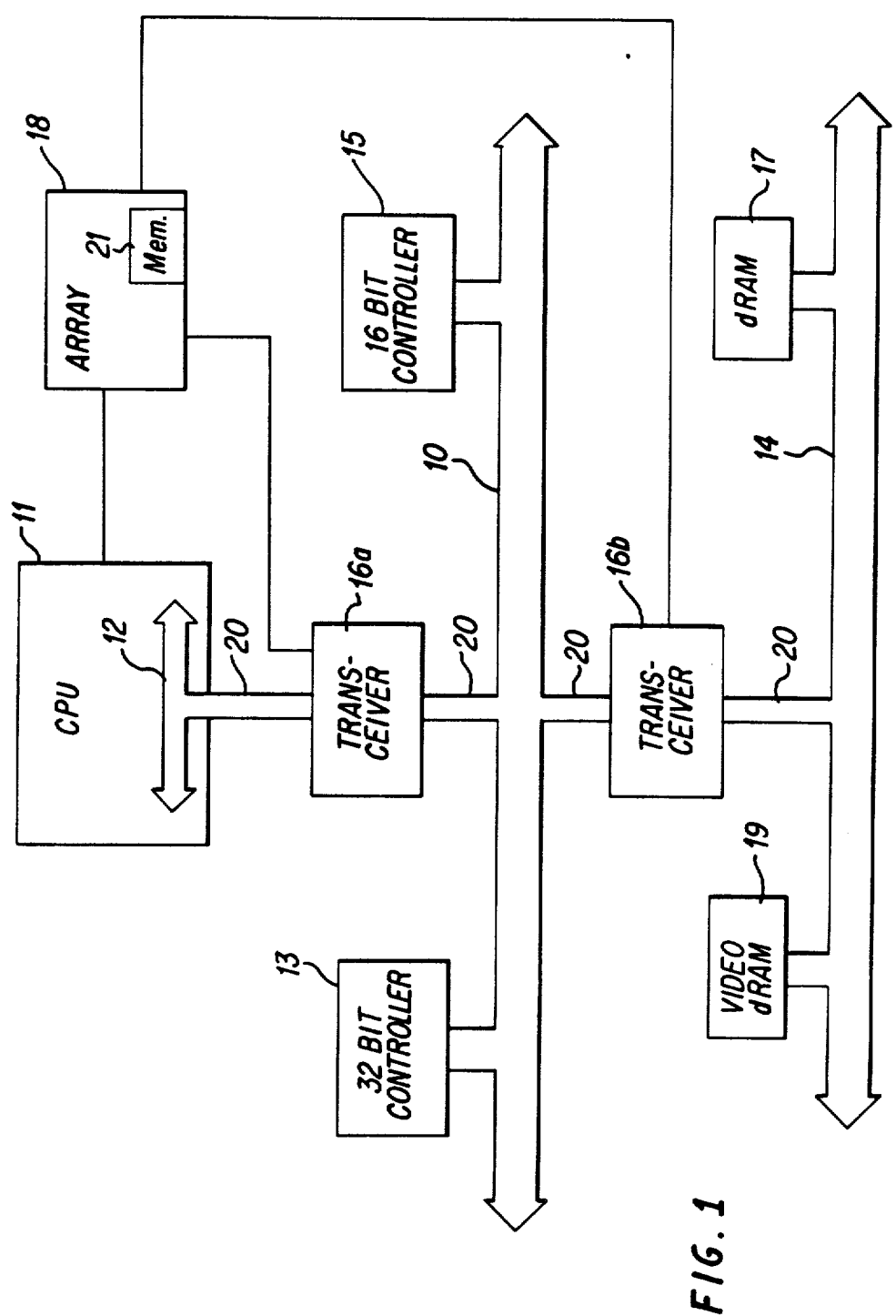
FIG. 1 illustrates an embodiment of a bus data controller in accordance with the present invention.

The present invention may be implemented in a data processing system in which there are a plurality of subsystems. Each subsystem may have its own data width As described above, it is desirable that data transfers occur between subsystems even if those subsystems have non-matching data widths.

FIG. 1 illustrates an embodiment of a bus data control scheme which enables the transfer of data between subsystem elements that have different data widths.

In FIG. 1 three main buses are illustrated. There is a primary bus 12, secondary bus 10 and tertiary bus 14. Primary bus 12 is associated with the CPU 11. Secondary bus 10 is associated with a subset of the subsystems of the data processing system Connected to bus 10 in FIG. 1 are a 32 bit controller 13 and a 16 bit controller 15. Connected to tertiary bus 14 are memory subsystems of the data processing system. These memory subsystems include a dRAM 17 and a video dRAM 19. Additional subsystem elements may be disposed so as to be connected to either the secondary bus 10 or the tertiary bus 14. Primary bus 12 is associated strictly with the CPU or the host of the data processing system. The primary bus 12, the secondary bus 10 and the tertiary bus 14 are 32 bit buses.

In the present invention known transceiver elements are used to connect the primary, secondary and tertiary buses. As can be seen in FIG. 1, a transceiver 16a is disposed between primary bus 12 and secondary bus 10. Connectors 20 connect transceiver 16a to these two buses. Transceiver element 16b provides coupling between secondary bus 10 and tertiary bus 14. Connectors 20 are utilized for coupling the transceivers 16b directly to the two buses 10 and 14.

It should be noted that the present invention is not limited to the use of three buses. Nor is it limited to the use of 2 transceivers. The present invention contemplates that transceiver elements which provide a gating effect for a flow of data are utilized to provide connections between each of the buses in the data processing system when a plurality of buses to which subsystems are attached are utilized Logic array element 18 is considered to be part of the host in this embodiment although the logic array element may be provided separately. The logic array element 18 is connected through the CPU 11 to primary bus 12. It is also connected to transceivers 16a and 16b. The array includes a memory 21.

The operation of this system will now be described in greater detail by means of an example. When it is desired that a data transfer occur, a transfer request signal is produced indicating that a first device desires a transfer of information between itself and a second device or subsystem. This data request signal is detected by control logic in the logic array 18 of FIG. 1. For example, should a 16 bit device such as a 16 bit controller 15 connected to the secondary bus 10 desire to write data to a 32 bit memory location in dRAM 17 connected to tertiary bus 14, a signal is produced which is detected by the control logic of the logic array 18 connected to the CPU 11. In response to this data request signal, the logic array 18 produces a control signal which is transmitted to the transceiver 16b that couples the secondary bus 10 and tertiary bus 14. The control signal sets forth an operation cycle that gates the flow of data from the secondary bus 10 into the tertiary bus 14.

The logic array 18 controls an operation by which data is shifted on the secondary bus 10. Data is shifted to direct the data into the proper bit position on the secondary bus for transfer to the tertiary bus and on to the 32 bit dRAM 17.

First the controller produces an address which equates to a 16 bit word location in the dRAM 17. The logic array 18 has a memory 21 associated with it that latches this address. The array 18 then produces the appropriate memory address in a Row Address-/Column Address (RAS/CAS) multiplexed format. The 16 bit controller 15 then places the data which it desires to send to the dRAM 17 onto the secondary bus 10. It is placed onto the low end of the secondary bus 10, locations 00 to 15 of the bus. The logic array 18 signals the transceiver 16b to allow the data from location 00 to 15 of the secondary bus 10 to flow to location 00 to 15, the low end of the tertiary bus 14. The logic array also causes a 16 bit write cycle to the 32 bit dRAM 17.

The 16 bit controller then produces an address which corresponds to the next 16 bit memory location. The array 18 latches the 16 bit word and again produces the correct RAS/CAS address for the memory. This second 16 bit word is placed on the low end of the secondary bus 10, location 00 to 15. The logic array directs that the 16 bit word to be transferred to the high end of secondary bus 10, locations 16 to 31. The logic array 18 then directs the transceiver 16b to allow the data to flow from the high end of the secondary bus 10 to the high end of the tertiary bus 14, locations 16 to 31. Finally the second and last 16 bit write to the dynamic random access memory 17 is initiated by the logic array 18. The write operation of 2 16 bit words from the 16 bit controller to a 32 bit memory location is complete.

The logic array 18 in concert with transceiver 16b is responsible for directing data over the secondary and tertiary buses so as to complete a data transfer from the 16 bit controller 15 to the 32 bit memory 17.

Due to the flexibility of the logic array 18 and the bidirectional nature of transceivers 16a, and 16b it is also possible to transfer data from a 32 bit device to a 16 bit device. For example, if the 16 bit controller desires to read information from the 32 bit memory 17 then similar activity to that described above would occur but in reverse order.

The controller produces an address for a 16 bit location in the 32 bit dRAM 17. Data is then moved from the word in the low end memory location, location 00 to 15 of the memory onto the low end of the tertiary bus 14. The transceiver receives a control signal from the logic array which enables the transceiver to pass the word appearing on the low end of the tertiary bus 14 to the low end of the secondary bus, 10. The data word is transferred to the disk controller along lines 00 to 15 of the secondary bus 10. The word in the high end of the memory location, 16 to 31 is transferred onto the tertiary bus 14. The data word is then directed to the low word area 00 to 15 of tertiary bus 14. The logic array 18 transmits a control signal to the transceiver 16b which enables the transceiver to pass the word on the low end of the tertiary bus 14 to the low end of the secondary bus 10. Therefore the original high word passes to the controller 15.

The logic array, in connection with the transceiver acts to control the flow of data between subsystems in the data processing system illustrated in FIG. 1. The logic array senses data transfer requests and sends appropriate control signals to the transceiver which couples the buses to which the subsystems that wish to communicate are attached. The logic array acts to shift data to appropriate locations on the bus to which the sending station is connected. The array then signals the transceiver to pass the data from the bus to which the sending subsystem is connected to the bus to which the receiving subsystem is connected.

As described above, the array and transceiver may provide connections between subsystems having data widths of 16 bits and 32 bits. It is also possible to have subsystem elements having an 8 bit data width. The array and transceiver can be easily adapted to control the flow of data so as to enable an 8 bit width subsystem to communicate with a 16 bit width device or a 32 bit width device. The logic array acts to latch portions of the data that is to be transmitted and to shift it into an appropriate position for receipt by the subsystem which is intended to receive the data communication. The logic array in operation with the transceiver acts as a traffic cop that directs data traffic between subsystems of the data processing system over a plurality of buses in that processing system.

The present invention reduces the amount of hardware necessary to enable communication between subsystems that have different data path widths. In addition, it reduces the amount of time necessary for communication between such elements. The invention allows the reduction of cost and complexity in data path management systems and also increases the reliability of those systems. The present invention allows high performance data path management through a sequence of latching and producing memory addresses in the RAS/CAS multiplexed format as described above and therefore removes the need for using registers and multiplexers on the inputs and outputs of the various subsystems.

What is claimed is:

1. A data path controller in a data processing system that includes a central processor unit and a plurality of subsystems, the controller providing for a transfer of data between subsystems having different data path widths, comprising:

a plurality of buses intercoupling the central processing unit and the plurality of subsystems, each bus having a data path width equal to or greater than a data path width of a subsystem having the greatest data path width, wherein at least two subsystems having differing data path widths are coupled to the same one of said plurality of buses; and means for controlling a flow of data between subsystems over said plurality of buses, said means for controlling being coupled to said plurality of buses and comprising, means for producing a control signal in response to a request to transfer data from a sending subsystem, which is coupled to one of the plurality of buses, to a receiving subsystem, which is coupled to one of the plurality of buses, and means for controlling the data width of a flow of data between any two of said plurality of buses, said means for controlling the data width being responsive to said control signal so that data from said sending subsystem is transferred to said receiving subsystem, wherein said means for controlling the data width is coupled between any two of said plurality of buses and receiving the control signal from said means for producing a control signal.

2. The data path controller of claim 1 wherein said means for controlling the data width of a flow of data comprises means for converting the data width of the data from said sending subsystem to the data width associated with said receiving subsystem.

3. The data path controller of claim 2 wherein said means for controlling the data width further comprises a bidirectional transceiver coupled between any two of said plurality of buses, said transceiver being responsive to said control signal and gating a flow of data between the buses to which it is coupled.

4. The data path controller of claim 2 wherein said means for producing a control signal comprises a control logic circuit disposed on a single chip.

5. A data path controller in a data processing system that includes a central processor unit and a plurality of subsystems, the controller providing for a transfer of data between subsystems having different data path widths, comprising:

a plurality of buses intercoupling the central processing unit and the plurality of subsystems, each bus having a data path width equal to or greater than a data path width of a subsystem having the greatest data path width, wherein at least two subsystems having differing data path widths are coupled to the same one of said plurality of buses; and means for controlling a flow of data between subsystems over said plurality of buses, said means for controlling being coupled to said plurality of buses and comprising, means for producing a control signal in response to a request to transfer data from a sending subsystem, which is coupled to one of the plurality of buses, to a receiving subsystem, wherein said means for producing the control signal comprises a control logic circuit, and means for controlling the data width of a flow of data between any two of said plurality of buses, said means for controlling the data width being responsive to said control signal so that data from said sending subsystem is transferred to said receiving subsystem, wherein said means for controlling the data width of a flow of data comprises means for converting the data width of the data from said sending subsystem to the data width associated with said receiving subsystem, said means for controlling the data width is coupled between any two of said plurality of buses and receiving the control signal from said means for producing a control signal.

6. A data path controller in a processing system including a plurality of subsystems and a central processing unit, the system providing data paths between subsystems which have different data widths and comprising:

a plurality of data buses, wherein each subsystem is coupled to a data bus;

means for coupling each of said plurality of data buses to the others of said plurality of data buses; and means for controlling said means for coupling in response to a data transfer request, so as to transfer data from a sending subsystem having a data width to a receiving subsystem having with its own data width 7. The data path controller of claim 6 wherein said means for coupling comprises at least one transceiver for each coupling of two of said plurality of buses.

8. The data path controller of claim 6 wherein said means for controlling said means for coupling comprises:

means for receiving said data transfer request;

means for directing data movement on the data bus to which said sending subsystem is coupled in response to said data transfer request; and means for producing a control signal as an output in response to said data transfer request, said control signal defines an operation cycle of said means for coupling which will enable the data transfer between data buses to which said sending and said receiving subsystems are coupled.

9. The system of claim 8 wherein said means for coupling comprises at least one bidirectional transceiver providing coupling between the data bus coupled to said sending subsystem and the data bus coupled to said receiving subsystem.

10. The system of claim 8 wherein said means for controlling said means for coupling comprises a control logic circuit disposed on a single chip.

* * * * *